US010171404B2

United States Patent
McCaffrey et al.

(10) Patent No.: US 10,171,404 B2
(45) Date of Patent: Jan. 1, 2019

(54) REPLY TO MOST RECENT MESSAGE (71) Applicant: International Business Machines Corporation, Armonk, NY (US)

(72) Inventors: Corey S. McCaffrey, Bethesda, MD (US); Fang Lu, Billerica, MA (US); Elaine I. Kuo, Pepperell, MA (US); Kimilee S. Gile, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/417,788

(22) Filed: Jan. 27, 2017

(65) Prior Publication Data

US 2017/0134332 A1    May 11, 2017

Related U.S. Application Data (63) Continuation of application No. 12/239,771, filed on Sep. 27, 2008.

(51) Int. Cl.
*H04L 12/58*    (2006.01)
*G06Q 10/10*    (2012.01)

(52) U.S. Cl.
CPC ........... *H04L 51/28* (2013.01); *G06Q 10/107* (2013.01); *H04L 51/04* (2013.01); *H04L 51/22* (2013.01)

(58) Field of Classification Search
CPC .......... H04L 51/28; H04L 51/04; H04L 51/22
USPC .......................................... 715/752; 709/206
See application file for complete search history.

(56) References Cited

U.S. PATENT DOCUMENTS

| | | | | |
|---|---|---|---|---|
| 5,872,925 A | * | 2/1999 | Han | G06Q 10/107 709/206 |
| 7,269,793 B2 | * | 9/2007 | Horsfall | G06Q 40/04 715/751 |
| 7,454,466 B2 | * | 11/2008 | Bellotti | G06Q 10/10 709/206 |
| 7,587,678 B1 | * | 9/2009 | English | G06Q 10/107 709/206 |
| 7,694,018 B2 | * | 4/2010 | Wuebker | H04L 63/02 709/238 |
| 7,788,326 B2 | * | 8/2010 | Buchheit | G06Q 10/107 709/206 |
| 7,933,961 B2 | * | 4/2011 | Mandel | G06Q 10/107 709/204 |
| 7,953,804 B2 | | 5/2011 | Van Belle et al. | |
| 8,006,191 B1 | * | 8/2011 | Anderson | G06Q 10/107 715/751 |
| 8,225,219 B2 | * | 7/2012 | Edelen | G06Q 10/107 709/206 |
| 8,265,665 B2 | | 9/2012 | Lazaridis | |

(Continued)

*Primary Examiner* — Daeho D Song
(74) *Attorney, Agent, or Firm* — BainwoodHuang (57) ABSTRACT

A computer communication system that allows a user to conveniently display the most recent received messages associated with another user, and to directly initiate composition of a reply to a selected one of those displayed messages. When the user selects the disclosed "Reply to Most Recent" user interface element, a user name entry user interface object is generated that allows the user to specify the name of another user. A reply message user interface object is generated directly to the user interface, such that the reply message user interface object includes a message composition window that is automatically loaded with content from a most recent message from the specified user, and recipients for the reply message are loaded from that most recent message.

1 Claim, 7 Drawing Sheets

(56) References Cited

U.S. PATENT DOCUMENTS

| | | | |
|---|---|---|---|
| 8,392,511 B2* | 3/2013 | Chakra | G06Q 10/107 709/206 |
| 9,313,160 B1* | 4/2016 | Shamis | H04L 51/16 |
| 2005/0149622 A1 | 7/2005 | Kirkland et al. | |
| 2006/0018441 A1* | 1/2006 | Timmins | H04M 3/4211 379/88.12 |
| 2006/0161849 A1* | 7/2006 | Miller | G06F 9/451 715/744 |
| 2006/0248151 A1 | 11/2006 | Belakovskiy et al. | |
| 2007/0106735 A1 | 5/2007 | Hardy, Jr. | |
| 2008/0096593 A1* | 4/2008 | Park | H04M 1/72552 455/466 |
| 2008/0098312 A1 | 4/2008 | Chang | |
| 2008/0162643 A1 | 7/2008 | Flach | |
| 2008/0162649 A1 | 7/2008 | Lee et al. | |
| 2008/0183823 A1* | 7/2008 | Valencia | G06Q 10/107 709/206 |
| 2008/0195953 A1 | 8/2008 | Sen | |
| 2008/0295000 A1* | 11/2008 | Kieselbach | G06Q 10/00 715/752 |
| 2009/0037541 A1* | 2/2009 | Wilson | G06Q 10/10 709/206 |
| 2009/0119678 A1 | 5/2009 | Shih et al. | |
| 2009/0125596 A1* | 5/2009 | Naick | G06Q 10/107 709/206 |
| 2009/0172109 A1* | 7/2009 | Weir | H04L 51/00 709/206 |
| 2009/0172118 A1 | 7/2009 | Lee et al. | |
| 2009/0228583 A1* | 9/2009 | Pocklington | G06Q 10/107 709/224 |
| 2009/0248813 A1* | 10/2009 | Sawhney | G06Q 10/107 709/206 |
| 2009/0319617 A1* | 12/2009 | Bhakar | G06Q 10/107 709/206 |
| 2010/0070591 A1 | 3/2010 | Steuer et al. | |

* cited by examiner

REPLY TO MOST RECENT MESSAGE

CROSS-REFERENCE TO RELATED APPLICATIONS

This is a Continuation of U.S. application Ser. No. 12/239,771, which is entitled "REPLY TO MOST RECENT MESSAGE" and which was filed on Sep. 27, 2008, the contents and teachings of which are hereby incorporated by reference in their entirety.

FIELD OF THE INVENTION

The present invention relates generally to electronic mail systems, and more specifically to an electronic mail system including a reply to most recent message feature.

BACKGROUND OF THE INVENTION

As it is generally known, electronic mail (also referred to as "e-mail" or "email") is a store-and-forward method of writing, sending, receiving and saving messages over electronic communication systems. Examples of e-mail include the Internet e-mail system based on the Simple Mail Transfer Protocol (SMTP), and systems based on other protocols, including intranet systems allowing users to share messages in support of workgroup collaboration.

When a user sends an e-mail message, it is often desirable for the message to be sent as a reply to a previously received message. For example, it may be desirable to send a message as a reply to a message previously received from a specific user, or received within a specific message thread. Reply messages may be advantageous, for example, because they may automatically include relevant text and or other content from a previous message, thus providing recipients with context and history from the e-mail conversation to which a new message belongs. However, in existing systems, in order to send a specific reply message, the sender may have to manually perform a search within his or her e-mail In-box and/or other message folders to locate a most recent message he or she has received from a specific person, or within a specific thread. If a sender has a large number of e-mail messages in their In-box and/or other message folders, or the original message to which they wish to reply is so old that it is difficult to locate, the sender may simply give up, disregard the original thread and send a new message without the context of the original thread.

Maintaining message threads has become increasingly important as more and more e-mail clients provide the ability to keep messages together in a conversation or threaded view. Messages sent outside of the appropriate thread become disconnected and harder to organize with the relevant original content. Despite recent improvements in automatically organizing received messages within threads, it is still often difficult to use existing systems to maintain threads when sending new messages without manual effort to search through old e-mail messages.

For the above reasons and others, it would be desirable to have a new solution that allows users to conveniently send reply messages even when they have large numbers of received e-mail messages in their In-box, and/or when a relevant previously received e-mail message to which they wish to reply is relatively old.

SUMMARY OF THE INVENTION

To address the above described and other shortcomings of previous approaches, a feature is disclosed for a computer communication system (e.g. e-mail or the like) that allows a user to conveniently display the most recent message or messages associated with another user, and to directly initiate composition of a reply to such a message. In one embodiment, a user selectable user interface object (e.g. button, menu item, etc.), referred to herein for purposes of explanation as a "Reply to Most Recent" user interface object, is provided within the user interface of the computer communication system at the same user interface level as other, separate, message function related user interface objects, such as "Create", "Reply", and/or "Forward" user interface objects, for example within a single common toolbar user interface object, menu, etc. When the user selects the "Reply to Most Recent" user interface object (e.g. by clicking on it), a user name entry user interface object is generated, such as a pop-up window or the like, that allows the user to specify (e.g. type, select, etc.) the name of another user. In one embodiment, in direct response to the user's specification of the user name, the disclosed system immediately generates a reply message user interface display object pre-loaded with message contents and addressees obtained from the most recent message either received from or sent to the user associated with the specified user name.

In an alternative embodiment, a list of most recent messages or message threads associated with the specified user name is generated from which the local user can select the specific message to which he or she wants to generate a reply. In such an embodiment, after the other user's name is specified, the list of most recent messages associated with that other user is displayed. For example, a list is displayed representing some number of messages most recently sent to or received from the other user. Alternatively, a list of those message threads in which the other user is a participant into which a message was most recently entered (either sent from or received by the local user) is displayed.

When the user selects (e.g. clicks on) one of the messages or message threads represented within the displayed list, a reply message user interface object is generated directly within the user interface, such that a reply message can be generated to the selected message or thread. The reply message user interface object includes a message composition window that is automatically loaded with content from the selected message or message thread, and in which recipients for the reply message being generated are loaded from the selected message or thread. The user can then add content to the automatically loaded content, or modify the automatically loaded content (e.g. by typing into and/or performing editing operations within the message composition window), and/or modify the automatically loaded addresses in the recipient fields, and then send the resulting reply message through the e-mail system.

Thus there is provided a new solution that allows users to conveniently send reply messages even when they have large numbers of e-mail messages in their In-box and/or other message folders, and/or when a relevant previous e-mail message to which they wish to reply is relatively old.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
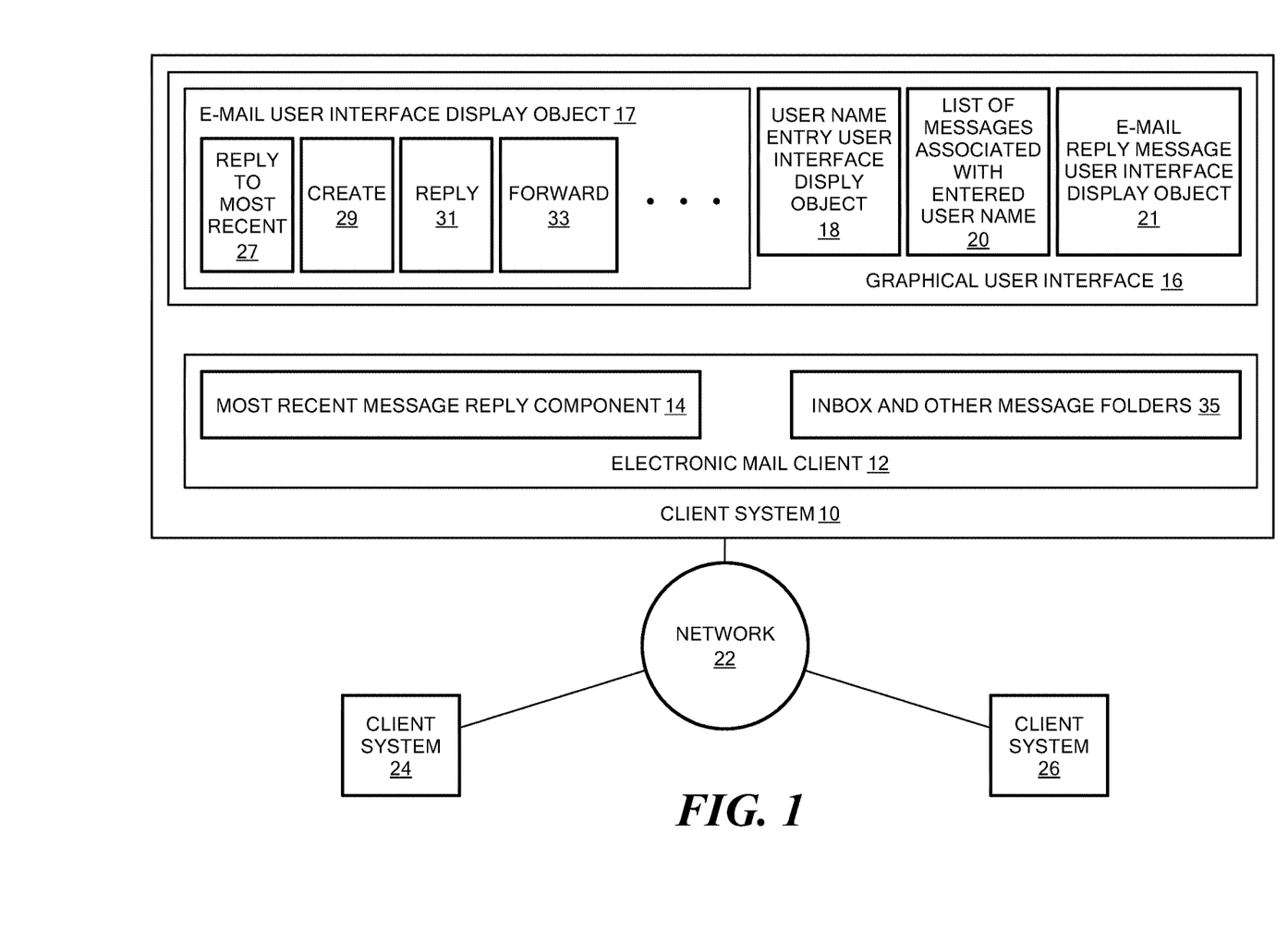
FIG. 1 is a block diagram showing hardware and/or software components in an illustrative embodiment of the disclosed system.

FIG. 1 is a block diagram showing hardware and/or software components in an illustrative embodiment of the disclosed system. As shown in FIG. 1, a Client System 10 includes an Electronic Mail Client 12 having a Most Recent Message Reply Component 14 and Inbox and Other Message Folders 35. The Electronic Mail Client 12 generates at least part of a Graphical User Interface 16. The Graphical User Interface 16 includes an E-mail User Interface Display Object 17 having a Reply to Most Recent User Interface Object 27, a Create User Interface Object 29, a Reply User Interface Object 31, a Forward User Interface Object 33, and/or other message operation command user interface objects. The E-Mail User Interface Display Object 17 may, for example, be made up of a tool bar, menu, or other specific type of graphical user interface display component. The user interface objects contained within the E-Mail User Interface Display Object 17 (e.g. 27, 29, 31 and 33) may, for example, be made up of graphical buttons, menu items, or any other specific type of user selectable graphical user interface components. The E-Mail User Interface Display Object 17 may, for example, be displayed as at least a portion of the default user interface screen generated by the Electronic Mail Client 12. Such a default user interface screen may also, for example, include a display of e-mail messages or the like sent to and/or from a local user through the Electronic Mail Client 12, and/or of folders or other logical constructs into which such messages are organized and/or stored.

The Graphical User Interface 16 generated by the Electronic Mail Client 12 further includes a User Name Entry User Interface Display Object 18, a List of Messages Associated with Entered User Name 20, and an E-mail Reply Message User Interface Display Object 21.

The Electronic Mail Client 12 may be any specific type of a client portion of any specific type of e-mail system, providing e-mail functions such as a store-and-forward method of writing, sending, receiving and saving messages over electronic communication systems. For example, during operation of the embodiment of FIG. 1, a local user of the Client System 10 uses the Electronic Mail Client 12 to exchange messages with local users of the Client System 24 and Client System 26, over the Network 22. The underlying e-mail system of which Electronic Mail Client 12 is part may, for example, be based on any specific protocol or protocols, such as the Internet e-mail system using the Simple Mail Transfer Protocol (SMTP), and/or other protocols.

During operation of the embodiment shown in FIG. 1, a local user of Client System 10 selects the Reply To Most Recent User Interface Object 27, e.g. by clicking on it using a mouse input device of the Client System 10. Responsive to detecting that the local user has selected the Reply To Most Recent User Interface Object 27, the embodiment of FIG. 1 operates to generate the User Name Entry User Interface Display Object 18. The User Name Entry User Interface Display Object 18 allows the local user to indicate another user, for example by entering the other user's name, user name, e-mail address, or the like. In response to the local user indicating the other user's name, the disclosed system locates one or more most recent messages sent to and/or received from that other user, for example within the Inbox and Other Message Folders 35. In a first embodiment, the disclosed system operates to generate the List of Messages Associated with Entered User Name 20, containing some number of list entries representing respective ones of the most recent messages either sent to and/or received from the other user. In such an embodiment, the local user can then select one of the messages represented in the List of Messages Associated with Entered User Name 20. In response to selection of one of the messages represented in the List of Messages Associated with Entered User Name 20, the selected message is used to populate portions of an E-Mail Reply Message User Interface Display Object 21 that is automatically generated without further action by the local user. The E-Mail Reply Message User Interface Display Object 21 is a reply message composition user interface object, having its address fields (e.g. TO:, CC:, etc.) fields automatically populated based on the message selected from the List of Messages Associated with Entered Name 20. For example, the destination fields (e.g. "TO:", "CC:") in the E-Mail Reply Message User Interface Display Object 21 are automatically loaded with the addresses of other users indicated in source (e.g. "FROM:") and/or destination fields of the selected message. Additionally, a message composition portion of the E-Mail Reply Message User Interface Display Object 21 is automatically loaded with the content of the selected message.

In another embodiment, the E-Mail Reply Message User Interface Display Object 21 is generated directly upon indication and/or selection of a user name or the like through the User Name Entry User Interface Display Object 18, based on the single most recent message received from or transmitted to the indicated other user. In such an embodiment, the List of Messages Associated with Entered User Name 20 need not be generated.

The list entries in the List of Messages Associated with Entered User Name 20 may, for example, indicate the last "N" individual messages most recently received from or sent to the other user, independent of the message thread to which the messages belong. Alternatively, the list entries in the List of Messages Associated with Entered User Name 20 may each indicate a corresponding message thread in which the other user was a participant (e.g. either as a sender or receiver of messages). In such an embodiment, the message threads represented in the List of Messages Associated with Entered User Name 20 may, for example, be those "N" threads in which the other user was a participant and into which messages were most recently entered (i.e. received by or sent to the local user). Any specific number "N" of messages or message threads may be represented in the List of Messages Associated with Entered User Name 20.

Other aspects of the operation of the components shown in the illustrative embodiment of FIG. 1 and other embodiments are described below.

The Client Systems 10, 24 and 26 of FIG. 1 may be any specific type of computer systems and/or intelligent electronic devices, such as a desktop, laptop, or palmtop computer systems, and/or personal digital assistants, cell phones, or other electronic devices. The Client Systems 10, 24 and 26 include or control display devices capable of displaying a graphical user interface (e.g. including Graphical User Interface 16) to a respective local user, such as a liquid crystal display (LCD), cathode ray tube (CRT), interferometric modulator display (IMOD), light emitting diode (LED), or the like.

Those skilled in the art will further recognize that the Electronic Mail Client 12 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Client Systems 10, 24 and 26 of FIG. 1 may each include one or more processors, and program storage, such as memory, for storing program code executable on such processors, as well as input/output devices and/or interfaces. In the example of FIG. 1, the Client Systems 12, 24 and 26 are interconnected by a data communication network (e.g. the Internet, a Local Area Network, etc.) through one or more of such input/output devices or interfaces, and through which may further be provided communication to a number of other client systems and/or remote server systems.

While for purposes of concise illustration a limited number of client systems are shown in FIG. 1, the disclosed system is not limited to any specific number of client and/or server systems.

Figure 2:
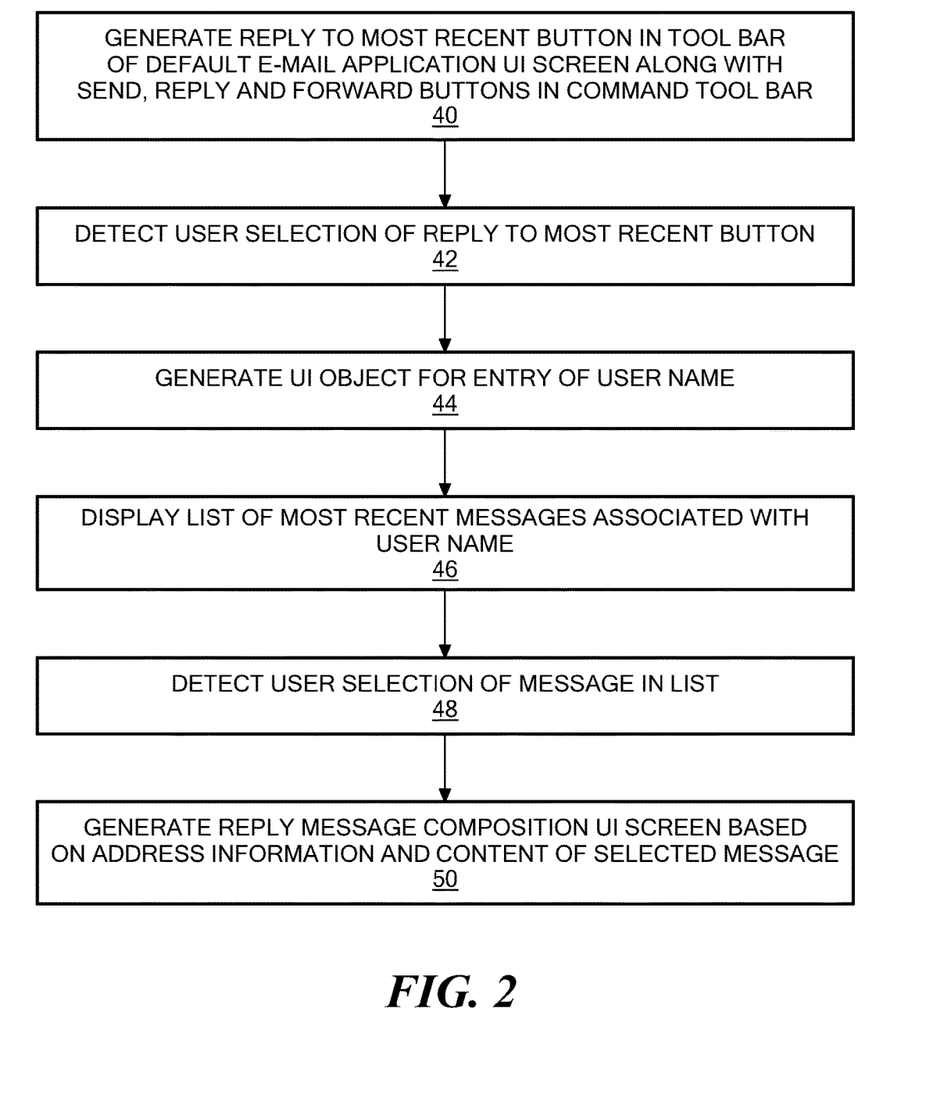
FIG. 2 is a flow chart showing steps performed during operation of an illustrative embodiment of the disclosed system.

FIG. 2 is a flow chart showing steps performed during operation of an illustrative embodiment. As shown in FIG. 2, at step 40 the disclosed system generates a "Reply to Most Recent" button or the like (e.g. Reply to Most Recent User Interface Object 27 in FIG. 1), for example within a tool bar of a default e-mail application user interface screen, together with other selectable user interface objects for e-mail message processing functions such as "Send", "Reply", and "Forward". At step 42, the disclosed system detects selection by the local user of the "Reply to Most Recent" user interface object (e.g. button). In response to the detection at step 42, the disclosed system generates a user interface object for entry of a user name, such as the User Name Entry User Interface Display Object 18 of FIG. 1.

At step 46, the embodiment of FIG. 2 displays a list representing the most recent messages associated with the user name entered at step 44, such as the List of Messages Associated with Entered User Name 20 of FIG. 1. At step 48, the embodiment of FIG. 2 detects user selection of a message representation within the list generated in step 46. The embodiment of FIG. 2 generates a reply message composition user interface screen at step 50, such as the E-Mail Reply Message User Interface Display Object 21 shown in FIG. 1. As noted above, steps 46 and 48 are only performed in one embodiment, and alternatively step 50 may be performed directly after step 44 using the most recent message associated with the user name entered at step 44.

Figure 3:
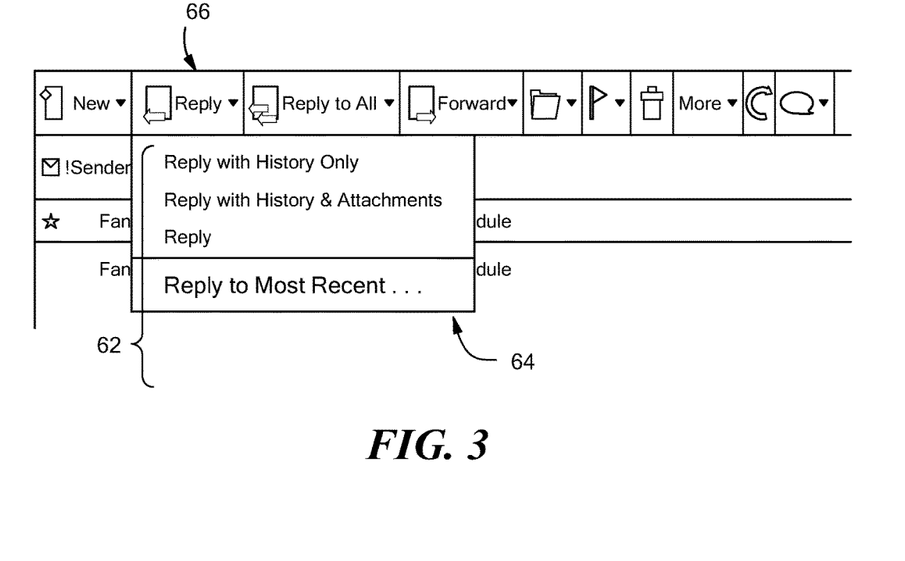
FIG. 3 is a simplified screen shot showing an example of a reply to most recent user interface object.

FIG. 3 is a simplified screen shot showing an example of a reply to most recent user interface object. In the example of FIG. 3, a pull-down menu 62 is generated in response to the user clicking on or otherwise selecting the "Reply" command 66. The pull-down menu 62 provides user access to a number of message commands, including a "Reply to Most Recent" command menu item 64. The "Reply to Most Recent" comment menu item 64 is an example of the Reply to Most Recent User Interface Object 27 shown in FIG. 1. While in the illustrative embodiment of FIG. 3 a menu item is provided as an example of the Reply to Most Recent User Interface Object 27, the present invention is not so limited, and any other appropriate type of user interface component may be used in the alternative, such as one or more graphical buttons, etc.

Figure 4:
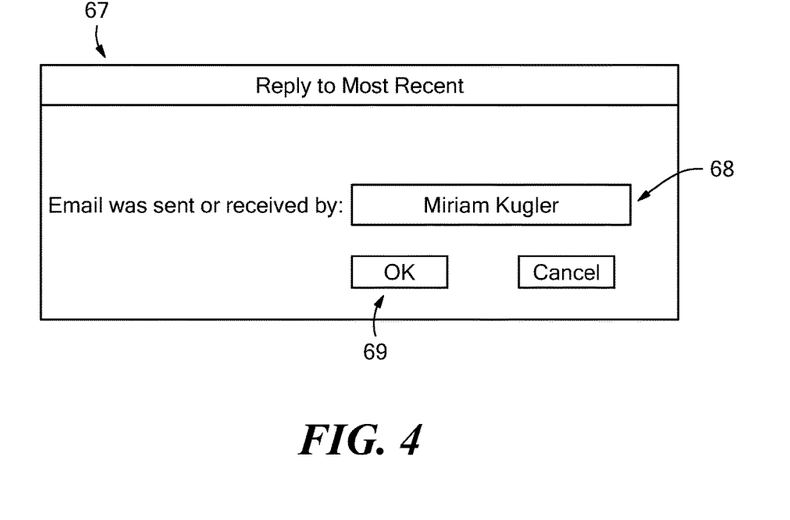
FIG. 4 is a simplified screen shot showing a first example of a user interface object allowing a user to specify a user name.

FIG. 4 is a simplified screen shot showing a first example of a user interface object allowing a user to specify a user name. The illustrative User Name Entry User Interface Object 67 of FIG. 4 is an example of the User Name Entry User Interface Display Object 18 of FIG. 1. The User Name Entry User Interface Object 67 includes a user name entry field 68, the contents of which is entered by the local user and input to the disclosed system when the user clicks on the "OK" button 69.

Figure 5:
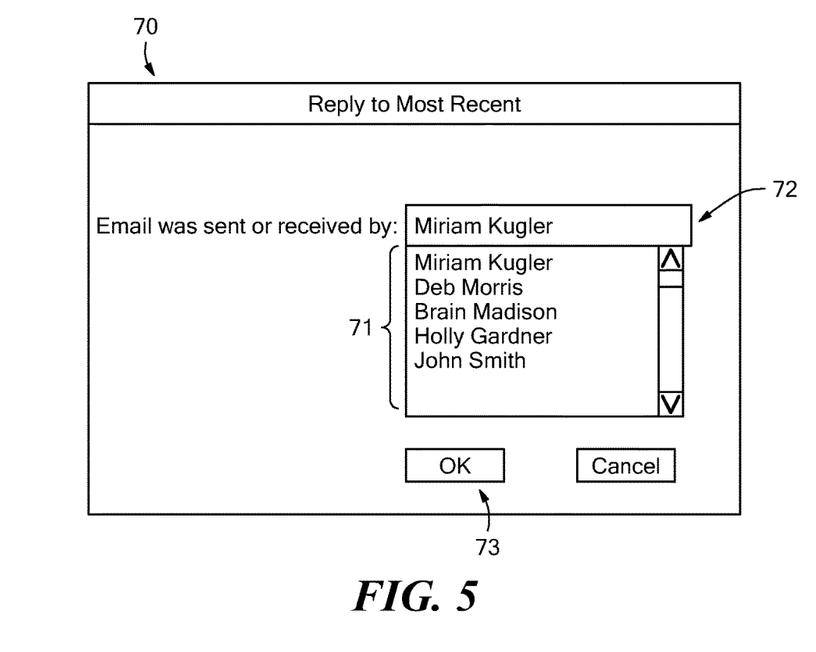
FIG. 5 is simplified screen shot showing a second example of a user interface object allowing a user to specify a user name.

FIG. 5 is a simplified screen shot showing a second example of a user interface object allowing a user to specify a user name. The illustrative User Name Selection User Interface Object 70 of FIG. 5 is an example of the User Name Entry User Interface Display Object 18 of FIG. 1. The User Name Selection User Interface Object 70 includes a drop-down box 71 that allows the local user to select from a list containing some predetermined number (e.g. between 5 and 15 or so) of his or her most recent contacts. After one of the names in the drop-down box 71 has been selected (e.g. clicked on), that name is displayed in the current name field 72 and then input as the specified name to the disclosed system when the user clicks on the "OK" button 73.

Figure 6:
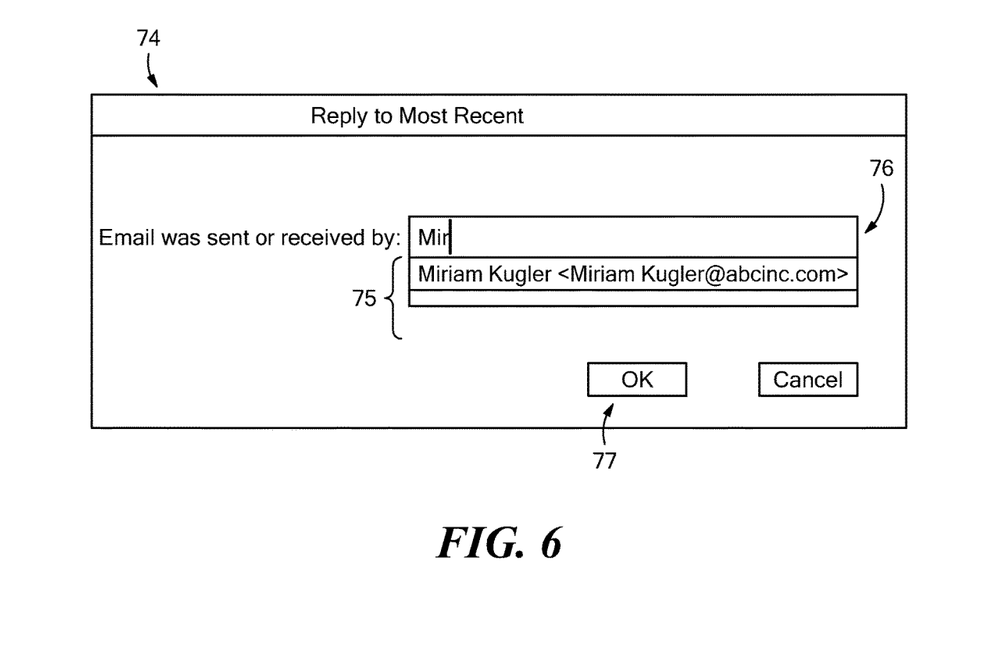
FIG. 6 is a simplified screen shot showing a third example of a user interface object allowing a user to specify a user name.

FIG. 6 is a simplified screen shot showing a third example of a user interface object allowing a user to specify a user name. The illustrative User Name Selection User Interface Object 74 of FIG. 6 is an example of the User Name Entry User Interface Display Object 18 of FIG. 1. The User Name Selection User Interface Object 74 includes an auto-complete box 76, which operates such that when the user starts typing a user name into the auto-complete box 76, a list 75 is automatically generated containing complete names that the user can select from (e.g. by clicking on the desired complete name, etc.). After one of the complete names in the list 75 has been selected (e.g. clicked on), that name is then input as the specified name to the disclosed system when the user clicks on the "OK" button 77.

Figure 7:
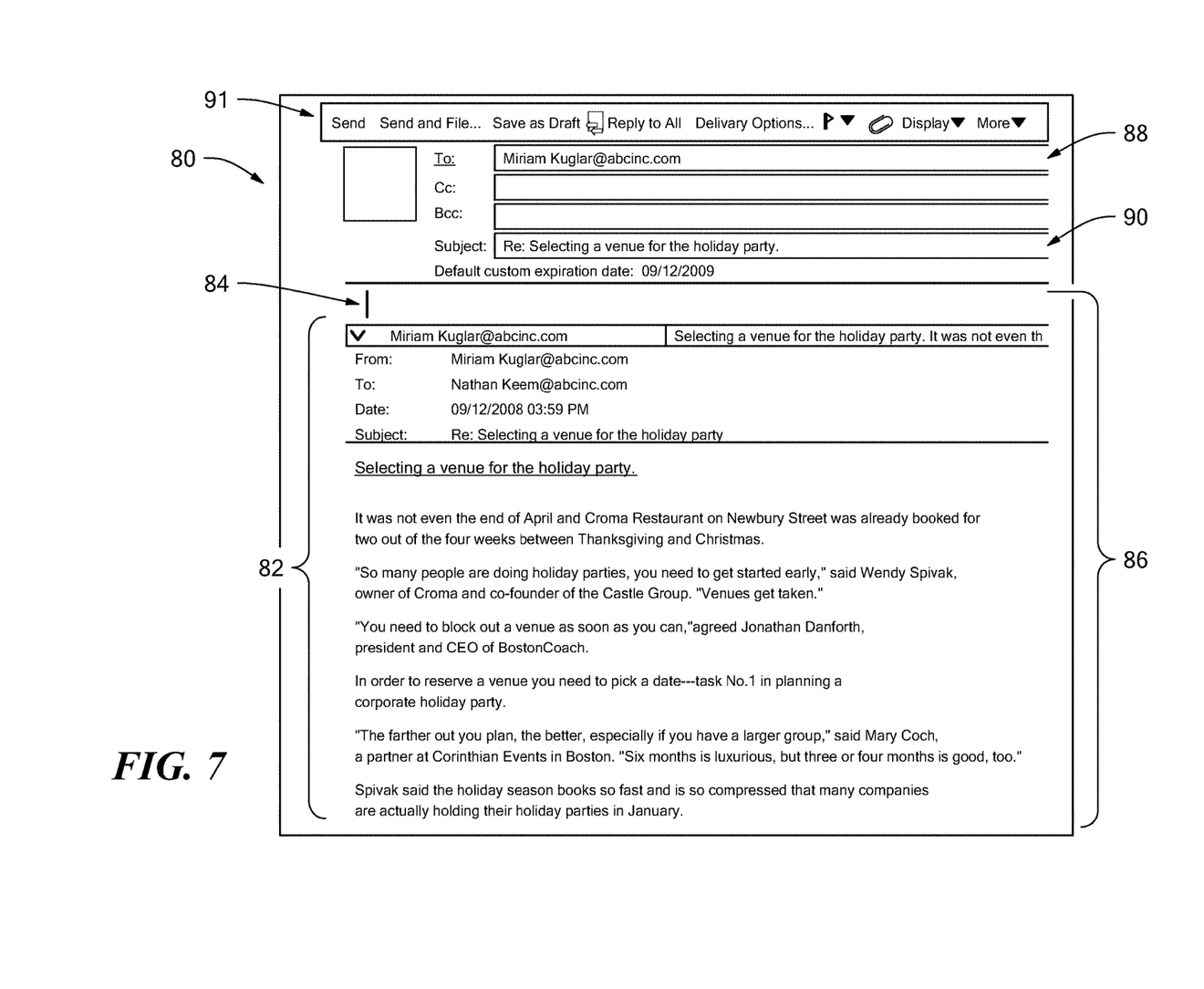
FIG. 7 is a simplified screen shot showing a first example of a user interface object for composing a reply message.

FIG. 7 is a simplified screen shot showing a first example of a user interface object for composing a reply message. The Reply Message Composition User Interface Object 80 of FIG. 7 is an illustrative example of the E-Mail Reply Message User Interface Display Object 21 of FIG. 1. As shown in FIG. 7, the Reply Message Composition User Interface Object 80 includes a Message Composition Portion 86, into which the contents 82 of the most recent message associated with the specified user name (e.g. "Miriam Kugler") are automatically loaded without user intervention. In the example of FIG. 7, the most recent message associated with "Miriam Kugler" is a message received from "Miriam Kugler" on Sep. 12, 2008, having a subject of "Re: Selecting a venue for the holiday party".

Similarly, the contents of the address fields (e.g. To:, Cc:, and Bcc:) are loaded with addresses extracted from the most recent message associated with the specified user name. For example, the "To:" field 88 is automatically loaded with the email address "Miriam_Kugler@abcinc.com". The contents of the "Subject:" field 90 is also automatically loaded with from the selected message with "Re: Selecting a venue for the holiday party.".

The cursor 84 is located in the Message Composition Portion 86, and the user can enter text into and/or modify the automatically loaded contents of the Message Composition Portion 86. When the message is complete, it can be sent through the e-mail system to the indicated recipients by clicking on the "Send" button 91.

Figure 8:
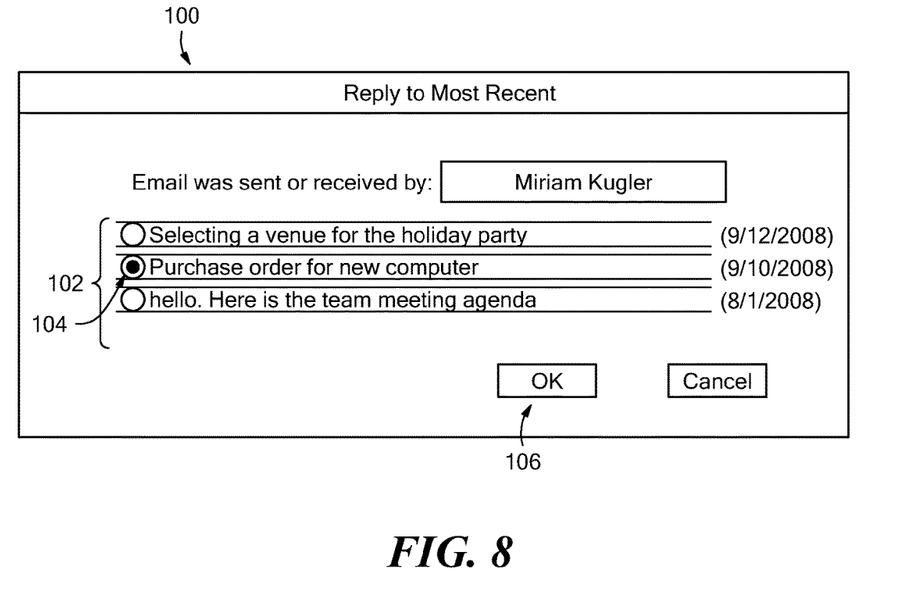
FIG. 8 is a simplified screen shot showing an example of a list of most recent messages displayed in a user interface.

FIG. 8 is a simplified screen shot showing an example of a list of most recent messages displayed in a user interface. In the illustrative example of FIG. 8, a Recent Message List Display Object 100 is shown including a List of Recent Messages 102 from the specified other user "Miriam Kugler". In the example of FIG. 8, the list shows more messages that were more recently sent or received towards the top, and less recent messages towards the bottom, in descending order of recentness. In one embodiment, the List of Recent Messages 102 contains the most recent messages either sent to or received from "Miriam Kugler", independent of the message thread to which the messages belong. Accordingly, in such an embodiment, the List of Recent Messages 102 could contain messages all from the same message thread, if such messages were the most recently sent to or received from "Miriam Kugler". In an alternative embodiment, the List of Recent Messages 102 contains indications of those message threads in which "Miriam Kugler" is a participant and in which messages were most recently received. In such an embodiment, the entries in the List of Recent Messages 102 would each indicate a separate message thread.

As it is used herein, the term "message thread" refers to a threaded discussion made up of an original message together with a sequence of related response messages conveyed among two or more users through an electronic communication system such as e-mail. For example, the messages in a message thread may be related to each other as reply "child" e-mail messages to previous "parent" e-mail messages within the thread, where the thread is originally started with and based on a first "root" e-mail message in the thread. Accordingly, messages contained in a given message thread may share a common subject or topic defined in an original "root" message.

The List of Recent Messages 102 is an example of the List of Messages Associated with Entered User Name 20 of FIG. 1.

In the example of FIG. 8, for purposes of explanation, the message representation 104 has been indicated by the user clicking on it, and the associated message or thread is then selected when the user clicks on the "OK" button 106.

Figure 9:
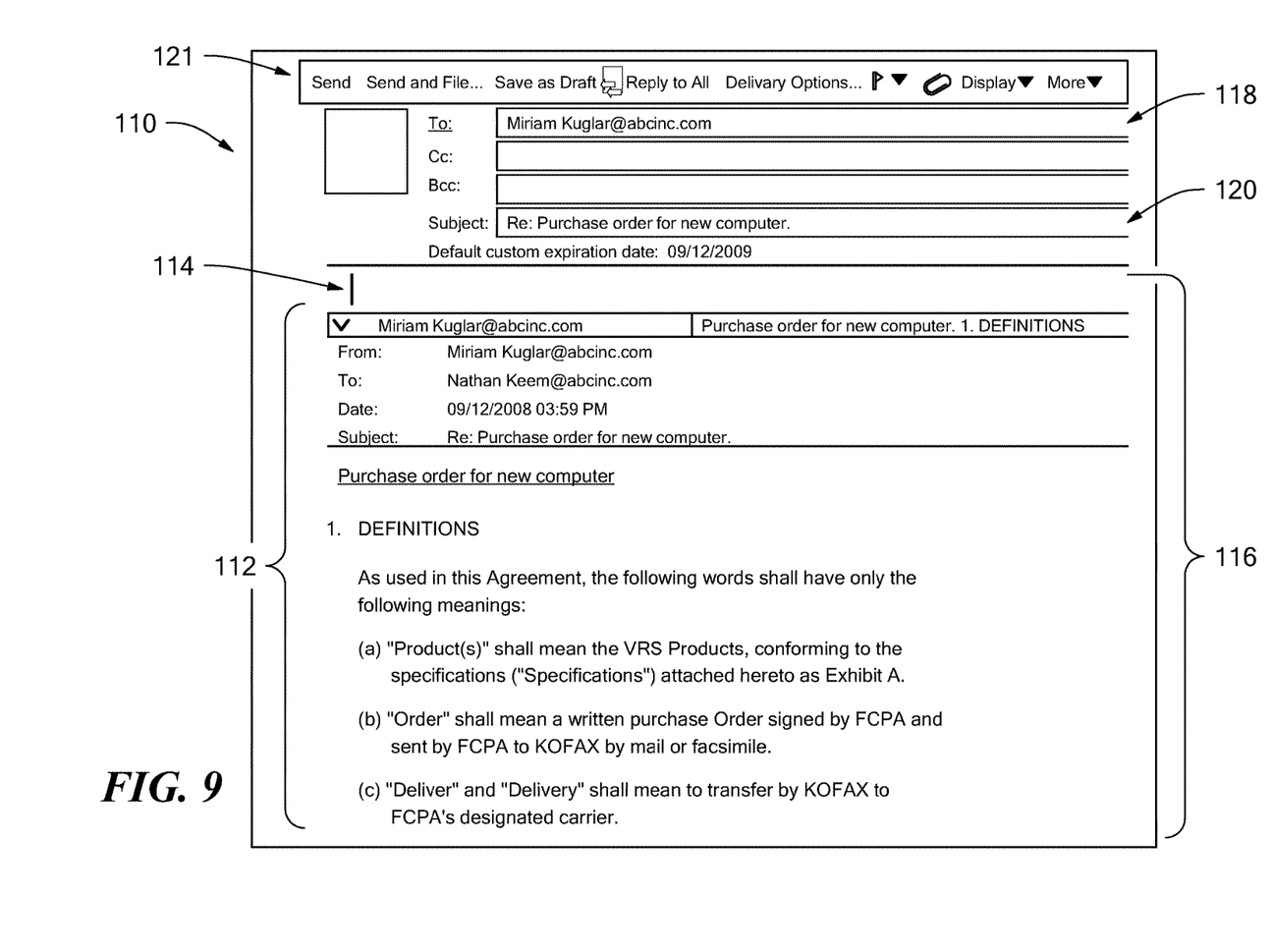
FIG. 9 is a simplified screen shot showing a second example of a user interface object for composing a reply message.

FIG. 9 is a simplified screen shot showing a second example of a user interface object for composing a reply message. The Reply Message Composition User Interface Object 110 of FIG. 9 is an illustrative example of the E-Mail Reply Message User Interface Display Object 21 of FIG. 1. As shown in FIG. 9, the Reply Message Composition User Interface Object 110 includes a Message Composition Portion 116, into which the contents 112 of the message selected by the user from the List of Recent Messages 102 (FIG. 8) are automatically loaded without user intervention. In the example of FIG. 9, the selected message is a message received from "Miriam Kugler" on Sep. 10, 2008, having a subject of "Re: Purchase order for new computer".

Similarly, the contents of the address fields (e.g. To:, Cc:, and Bcc:) are loaded with addresses extracted from message selected by the user from the List of Recent Messages 102. For example, the "To:" field 118 is automatically loaded with the email address "Miriam_Kugler@abcinc.com". The contents of the "Subject:" field 120 is also automatically loaded with from the selected message with "Re: Purchase order for new computer".

The cursor 114 is located in the Message Composition Portion 116, and the user can enter text into and/or modify the automatically loaded contents of the Message Composition Portion 116. When the message is complete, it can be sent through the e-mail system to the indicated recipients by clicking on the "Send" button 121.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

Moreover, while the above description of illustrative embodiments refers in various places to "user names", the present invention is not limited in that regard. Accordingly, in various specific embodiments, the term "user name" as used herein may refer to any specific type of user identifier, address, or other unique user representation. For example, the disclosed system may be embodied such that the "user names" it employs include and/or are made up of e-mail addresses, on-line handles or "screen names", or any other specific kind or type of user identifier that allows one user to uniquely identify a specific other user.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method comprising: presenting, to a local user among a group of simultaneously displayed command icons within a first email messaging user interface window, a reply command icon labeled "Reply"; detecting that the local user has clicked on the reply command icon; presenting a pull down menu in the first user interface window in response to detecting that the local user clicked on the reply command icon, wherein presenting the pull down menu includes displaying a reply-to-most-recent command menu item among a group of simultaneously displayed pull-down menu command menu items, wherein the reply-to-most-recent command menu item is labeled "Reply to Most Recent"; detecting that the local user has clicked on the reply-to-most-recent command menu item in the pull down menu; presenting a reply-to-most-recent pop-up window labeled "Reply to Most Recent" in response to detecting that the local user has clicked on the reply-to-most-recent command menu item in the pull down menu, wherein the reply-to-most-recent window initially presents a name entry field for receiving a typed entry from the local user and does not present any list of emails; receiving, through the name entry field in the reply-to-most-recent pop-up window labeled "Reply to Most Recent", a named typed by the local user; locating, within an inbox of the local user, and in response to receipt of the name typed by the local user into the name entry field of the pop-up window labeled "Reply to Most Recent", a most recent message contained in the inbox of the local user that was sent to or received from a user corresponding to the name typed into the name entry field of the pop-up window labeled "Reply to Most Recent"; in direct response to receiving the name typed by the local user into the name entry field of the pop-up window labeled "Reply to Most Recent", and without additional input from the local user, presenting a reply user interface display object for composing a reply message to the most recent message contained in the inbox of the local user that was sent to or received from a user corresponding to the name typed into the name entry field of the pop-up window labeled "Reply to Most Recent", wherein the reply user interface display object includes a send button user interface object, and wherein presenting the reply user interface display object for composing the reply message to the most recent message contained in the inbox of the local user that was sent to or received from a user corresponding to the name typed into the name entry field of the pop-up window labeled "Reply to Most Recent" includes pre-loading, in direct response to receiving the name typed by the local user into the name entry field of the pop-up window labeled "Reply to Most Recent" and without intervention of the local user i) in a message composition portion in the reply user interface display object, an embedded message contents of the most recent message contained in the inbox of the local user that was sent to or received from a user corresponding to the name typed into the name entry field of the pop-up window labeled "Reply to Most Recent", ii) in a plurality of address fields in the reply user interface display object, email addresses extracted from the most recent message contained in the inbox of the local user that was sent to or received from a user corresponding to the name typed into the name entry field of the pop-up window labeled "Reply to Most Recent", and iii) in a subject field in the reply user interface display object, a subject of the most recent message contained in the inbox of the local user that was sent to or received from a user corresponding to the name typed into the name entry field of the pop-up window labeled "Reply to Most Recent"; receiving text typed by the local user into the message composition portion in the reply user interface display object; detecting that the user has clicked on the send button user interface object in the reply user interface display object; and in response to detecting that the user has clicked on the send button user interface object in the reply user interface display object, and without further input from the local user, transmitting a reply email message with a contents equal to a complete contents of the message composition portion of the reply user interface display object, wherein the complete contents of the message composition portion of the reply user interface display object includes the text typed by the local user into the message composition portion in the reply user interface display object and the contents of the most recent message contained in the inbox of the local user that was sent to or received from a user corresponding to the name typed into the name entry field of the pop-up window labeled "Reply to Most Recent" that was preloaded into the message composition portion in the reply user interface display object, and with a subject equal to the subject preloaded into the subject field in the reply user interface display object from the most recent message contained in the inbox of the local user that was sent to or received from a user corresponding to the name typed into the name entry field of the pop-up window labeled "Reply to Most Recent", to the email addresses pre-loaded into the plurality of address fields in the reply user interface from the most recent message contained in the inbox of the local user that was sent to or received from a user corresponding to the name typed into the name entry field of the pop-up window labeled "Reply to Most Recent".

* * * * *